(12) United States Patent
Dziak et al.

(10) Patent No.: US 11,897,534 B2
(45) Date of Patent: Feb. 13, 2024

(54) WAGON STROLLER, SYSTEMS, AND METHODS

(71) Applicant: GRACO CHILDREN'S PRODUCTS, INC., Atlanta, GA (US)

(72) Inventors: Dan Dziak, Alpharetta, GA (US); Lauren Pusey, Woodstock, GA (US)

(73) Assignee: GRACO CHILDREN'S PRODUCTS, INC., Atlanta, GA (US)

( * ) Notice: Subject to any disclaimer, the term of this patent is extended or adjusted under 35 U.S.C. 154(b) by 185 days.

(21) Appl. No.: 17/500,802

(22) Filed: Oct. 13, 2021

(65) Prior Publication Data

US 2022/0111882 A1 Apr. 14, 2022

Related U.S. Application Data

(60) Provisional application No. 63/091,905, filed on Oct. 14, 2020.

(51) Int. Cl.
*B62B 7/06* (2006.01)

(52) U.S. Cl.
CPC .................. *B62B 7/062* (2013.01)

(58) Field of Classification Search
CPC . B62B 7/062; B62B 2205/26; B62B 2205/20; B62B 7/06; B62B 7/004; B62B 2205/18; B62B 7/064
See application file for complete search history.

(56) References Cited

U.S. PATENT DOCUMENTS

| | | |
|---|---|---|
| 2,428,935 A | 10/1947 | Hansburg |
| 2,534,539 A | 12/1950 | Topper |
| 5,876,057 A * | 3/1999 | Huang ............ B62B 7/08 280/658 |
| 6,659,672 B1 | 12/2003 | Kirita |
| 6,991,248 B2 | 1/2006 | Valdez et al. |
| D634,245 S | 3/2011 | Liao |
| D643,345 S | 8/2011 | Barenbrug |

(Continued)

FOREIGN PATENT DOCUMENTS

| | | |
|---|---|---|
| CN | 105235733 B | 1/2000 |
| CN | 101348124 B | 6/2010 |

(Continued)

OTHER PUBLICATIONS

Translated CN-208198538-U (Year: 2023).*
Translated CN-109843695-A (Year: 2023).*

*Primary Examiner* — James A Shriver, II
*Assistant Examiner* — Ian Bryce Shelton
(74) *Attorney, Agent, or Firm* — Eversheds Sutherland (US) LLP

(57) ABSTRACT

Embodiments disclosed herein are generally related to children's stroller systems and more particularly to systems, methods, and apparatus for providing a compact folding wagon-style stroller. In at least one embodiment, a compact folding wagon-style stroller can be provided. The stroller can include a stroller frame including a handle that can be folded into a collapsed position and a group of one or more tubes coupled to one another via a floating hub, wherein the floating hub includes a slidable release grip. When the slidable release grip is actuated by a user, the group of one or more tubes are permitted to rotate from an operable configuration to a closed or folded position.

18 Claims, 8 Drawing Sheets

(56) References Cited

U.S. PATENT DOCUMENTS

| | | |
|---|---|---|
| D643,346 S | 8/2011 | Barenbrug |
| D643,786 S | 8/2011 | Barenbrug |
| 8,205,907 B2 | 6/2012 | Chicca |
| 8,276,935 B2 | 10/2012 | Minato et al. |
| 8,408,580 B2 | 4/2013 | Liao |
| 8,517,412 B2 | 8/2013 | Tsai et al. |
| 8,590,919 B2 | 11/2013 | Yi |
| 8,596,669 B2 | 12/2013 | Liao |
| 8,672,341 B2 | 3/2014 | Offord |
| 8,696,015 B2 | 4/2014 | Karremans et al. |
| 8,777,252 B2 | 7/2014 | Winterhalter |
| 8,870,213 B1* | 10/2014 | Xu .................. B62B 7/08 280/647 |
| 8,870,214 B2 | 10/2014 | Kane et al. |
| 8,876,146 B2 | 11/2014 | Smith et al. |
| 8,894,089 B2 | 11/2014 | Clifton |
| 8,985,616 B1* | 3/2015 | Chen ............... B62B 7/062 280/47.38 |
| 8,991,852 B2 | 3/2015 | Mitzman |
| 8,991,854 B2 | 3/2015 | Greger et al. |
| D726,078 S | 4/2015 | Liao |
| 9,044,104 B2 | 6/2015 | Smith |
| 9,050,993 B2 | 6/2015 | Pollack |
| 9,056,619 B2 | 6/2015 | Tran |
| 9,056,622 B2 | 6/2015 | Thomas et al. |
| 9,085,312 B2 | 7/2015 | Liu |
| 9,108,656 B1 | 8/2015 | Nolan et al. |
| 9,108,659 B2* | 8/2015 | Sparling ........... B62B 7/142 |
| 9,199,658 B2 | 12/2015 | Chuah |
| 9,242,663 B1 | 1/2016 | Nolan et al. |
| 9,260,128 B2 | 2/2016 | Liu |
| 9,308,929 B1 | 4/2016 | Dowd et al. |
| 9,327,749 B2 | 5/2016 | Young et al. |
| 9,358,445 B1 | 6/2016 | Nolan et al. |
| 9,365,230 B2 | 6/2016 | Cheng |
| 9,469,324 B2 | 10/2016 | Bowman et al. |
| 9,475,516 B1 | 10/2016 | Wang |
| 9,493,178 B2 | 11/2016 | Smith et al. |
| 9,561,816 B2 | 2/2017 | Dowd et al. |
| 9,566,818 B2 | 2/2017 | Kamitani et al. |
| 9,580,098 B2 | 2/2017 | Eisinger |
| 9,630,642 B2 | 4/2017 | Zehfuss et al. |
| 9,637,154 B2 | 5/2017 | Liu |
| 9,642,767 B1 | 5/2017 | Kavanagh et al. |
| 9,701,333 B2 | 7/2017 | Liu |
| 9,725,106 B2 | 8/2017 | Pos |
| 9,763,849 B2 | 9/2017 | Paterson et al. |
| 9,821,831 B2 | 11/2017 | Reaves et al. |
| 9,862,400 B2 | 1/2018 | Valdez et al. |
| 9,950,729 B2 | 4/2018 | Choi |
| 9,981,678 B1 | 5/2018 | Chen |
| 10,000,226 B2 | 6/2018 | Yi |
| 10,023,217 B2 | 7/2018 | Sack et al. |
| 10,035,532 B2 | 7/2018 | Gao et al. |
| 10,077,062 B2 | 9/2018 | Bowman et al. |
| 10,106,185 B2 | 10/2018 | Nigel et al. |
| 10,155,528 B2 | 12/2018 | Zhong et al. |
| 10,173,710 B1 | 1/2019 | Cheng |
| 10,214,230 B2 | 2/2019 | Delgatty et al. |
| 10,279,831 B2 | 5/2019 | Huang et al. |
| 10,286,941 B2 | 5/2019 | Li et al. |
| 10,315,681 B2 | 6/2019 | Pujol et al. |
| 10,322,740 B2 | 6/2019 | Chen |
| 10,343,704 B2 | 7/2019 | Oakes |
| 10,414,422 B2 | 9/2019 | Choi |
| 10,449,987 B2 | 10/2019 | Gibson |
| 10,479,389 B2 | 11/2019 | Zhong |
| 10,501,106 B2 | 12/2019 | Yuan |
| 10,507,857 B2 | 12/2019 | Bowman et al. |
| 10,597,058 B2 | 3/2020 | Bowman et al. |
| 10,730,543 B2 | 8/2020 | Lee et al. |
| 10,787,188 B2 | 9/2020 | Popp |
| 10,822,012 B2 | 11/2020 | Liu |
| 10,836,419 B2 | 11/2020 | Oakes |
| 2007/0284900 A1 | 12/2007 | Sze |
| 2008/0088116 A1 | 4/2008 | Den Boer |
| 2011/0248477 A1* | 10/2011 | Chen .................. B62B 7/10 280/647 |
| 2013/0140797 A1* | 6/2013 | Fritz ................. B62B 7/06 280/649 |
| 2018/0065655 A1* | 3/2018 | Leys ................. B62B 7/064 |
| 2019/0322304 A1 | 10/2019 | Zhong |
| 2020/0079407 A1 | 3/2020 | Bowman et al. |
| 2020/0139999 A1 | 5/2020 | Ma et al. |
| 2020/0255046 A1 | 8/2020 | Bowman et al. |
| 2020/0283051 A1 | 9/2020 | Liao |
| 2020/0324801 A1 | 10/2020 | Choi |
| 2020/0353967 A1* | 11/2020 | Horst ............... B62B 7/064 |
| 2020/0353968 A1* | 11/2020 | Horst ............... B62B 9/102 |
| 2021/0016818 A1 | 1/2021 | Zhu |
| 2021/0387659 A1* | 12/2021 | Zhang .............. B62B 7/064 |
| 2021/0403069 A1* | 12/2021 | Wang ................ B62B 7/08 |

FOREIGN PATENT DOCUMENTS

| | | | | |
|---|---|---|---|---|
| CN | 301611296 | | 7/2011 | |
| CN | 302371817 | | 3/2013 | |
| CN | 203318470 U | * | 12/2013 | ............ B62B 7/062 |
| CN | 302709527 | | 1/2014 | |
| CN | 103029730 A | | 6/2015 | |
| CN | 103072610 B | | 7/2015 | |
| CN | 103359147 B | | 12/2015 | |
| CN | 103419827 B | | 1/2016 | |
| CN | 103754248 B | | 1/2016 | |
| CN | 103802877 B | | 1/2016 | |
| CN | 104309675 B | | 11/2016 | |
| CN | 103269936 B | | 2/2017 | |
| CN | 304493360 | | 2/2018 | |
| CN | 106043399 B | | 4/2018 | |
| CN | 108778892 A | | 11/2018 | |
| CN | 108891472 A | * | 11/2018 | ............ B62B 3/007 |
| CN | 304886799 | | 11/2018 | |
| CN | 208198538 U | * | 12/2018 | |
| CN | 305059757 | | 3/2019 | |
| CN | 208827908 U | * | 5/2019 | |
| CN | 109843695 A | * | 6/2019 | ............... A47D 1/10 |
| CN | 109843695 A | | 6/2019 | |
| CN | 109153398 B | | 10/2019 | |
| CN | 110481622 A | * | 11/2019 | |
| CN | 108749905 B | | 1/2020 | |
| CN | 110667681 A | * | 1/2020 | |
| CN | 110758534 A | | 2/2020 | |
| CN | 305789845 | | 5/2020 | |
| CN | 305835287 | | 6/2020 | |
| CN | 305835297 | | 6/2020 | |
| CN | 109562773 B | | 9/2020 | |
| CN | 111619647 A | * | 9/2020 | |
| DE | 202014103072 U1 | * | 11/2014 | ............ B62B 7/062 |
| DE | 202018104948 U1 | * | 12/2018 | ............ B62B 7/06 |
| DE | 202019104995 U1 | * | 12/2019 | ............ B62B 7/04 |
| EP | 3159239 A1 | * | 4/2017 | ............ B62B 7/062 |
| WO | WO-2017153980 A1 | * | 9/2017 | ............ B62B 7/062 |
| WO | WO-2020146576 A1 | * | 7/2020 | ............ B62B 3/022 |

* cited by examiner

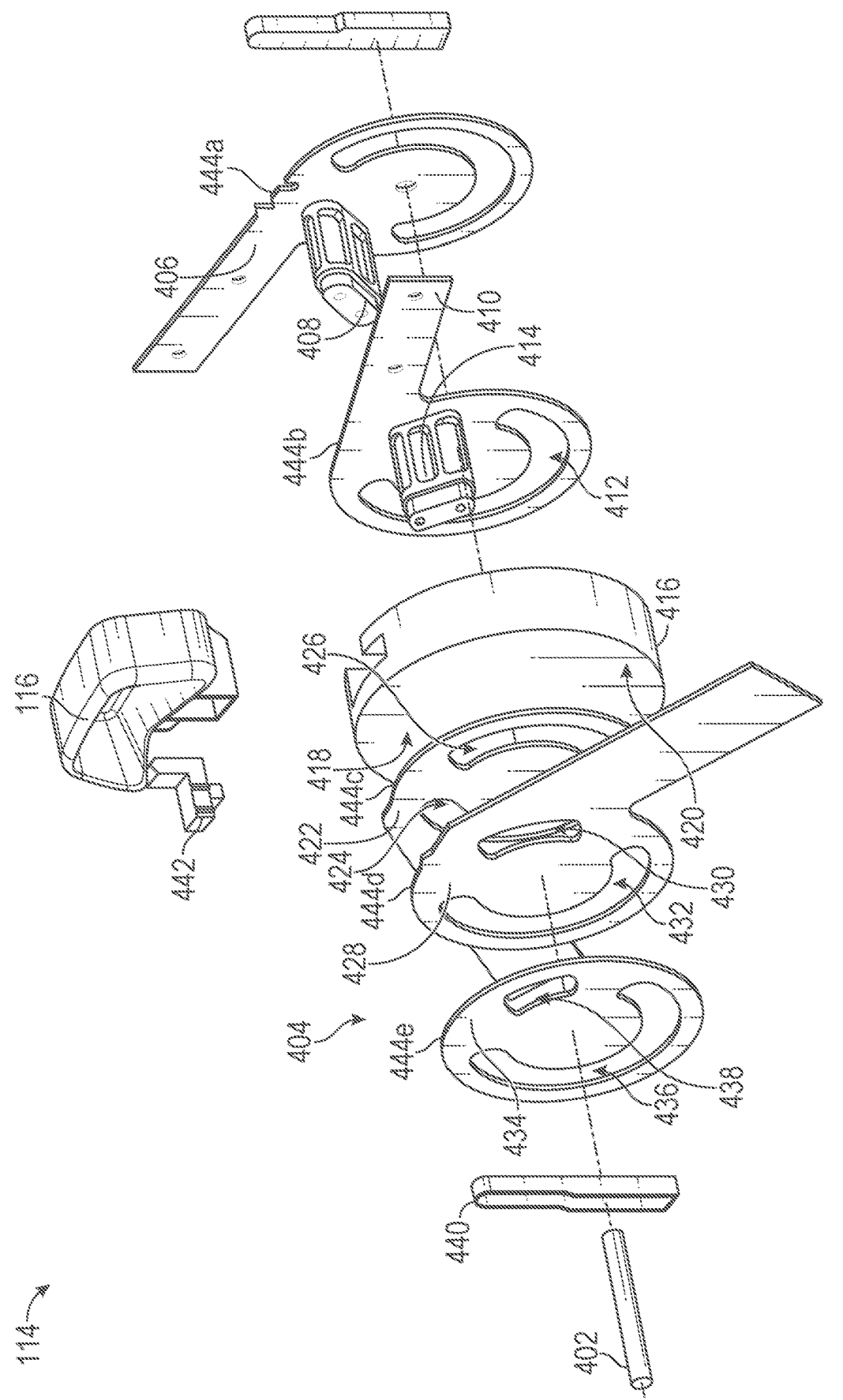

WAGON STROLLER, SYSTEMS, AND METHODS

RELATED APPLICATION

This application claims priority under 35 U.S.C. § 119 to U.S. Provisional Patent Application No. 63/091,905, filed Oct. 14, 2020, and titled "WAGON STROLLER, SYSTEMS, AND METHODS," the entire contents of which are hereby incorporated by reference for all purposes.

TECHNICAL FIELD

This disclosure relates generally to strollers and to systems for collapsing strollers and, in particular, relates to wagon-style strollers, systems, and methods of use and operation.

BACKGROUND

Conventional wagon-style strollers are characterized by the ability for toddlers or children to sit, stand, recline, and move about the stroller. To accommodate this versatility, such wagon-style strollers typically include a reversible handle allowing the user to swap between a "push" configuration and a "pull" configuration. Such wagon-style strollers also include the ability to attach accessories, including an infant child seat (ICS), permitting a user to transport one or more children of varying ages. This flexibility and versatility can result in an increased size compared to standard strollers, which typically include one formed seat with only one position for the child.

Parents typically transport strollers in their automobiles when traveling. Many conventional strollers are configured to fold into a smaller size that can be easily stowed in an automobile. However, as a result of their increased size, conventional wagon-style strollers often cannot be folded into an easily stowed form factor. Furthermore, the reversibility of the handle further limit the collapsibility of the stroller.

BRIEF DESCRIPTION OF THE DRAWINGS

The detailed description is set forth with reference to the accompanying drawings. The use of the same reference numerals may indicate similar to identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 4 illustrates an exploded view of an example hub for a wagon-style stroller according to an embodiment of the disclosure.

Figure 1:
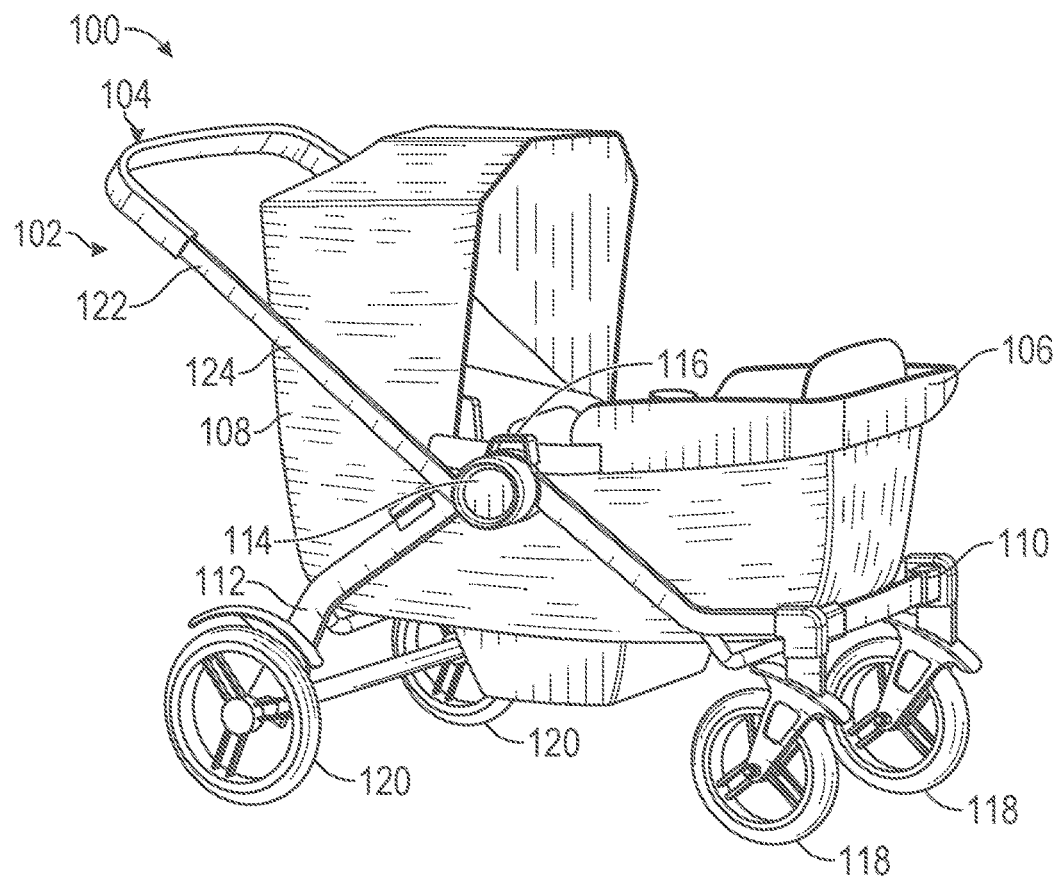
FIG. 1 illustrates a perspective view of an example wagon-style stroller in an open, operable, or use configuration, according to an embodiment of the disclosure.

Example embodiments now will be described more fully hereinafter with reference to the accompanying drawings, in which example embodiments are shown. The concept disclosed herein may, however, be embodied in many different forms and should not be construed as limited to the exemplary embodiments set forth herein; rather, these embodiments are provided so that this disclosure will be thorough and complete, and will fully convey the scope of the claimed concept to those of ordinary skill in the art. Like numbers refer to like, but not necessarily the same, elements throughout.

DETAILED DESCRIPTION

The example embodiments described herein and shown in the figures are described with reference to a wagon-style stroller (referred to hereinafter as a "stroller") that includes a floating hub at which the various stroller frame tubes are coupled, and about which each of the various stroller frame tubes rotate. The stroller includes a slidable release grip that may be actuated by a user, when the stroller is in an open, operable, or use configuration, causing a forward upper tube to rotate from its respective initial position about the hub towards a forward leg tube, the forward leg tube to rotate from its respective initial position about the hub towards a rear leg tube, a rear upper tube to rotate from its respective initial position about the hub towards the rear leg tube, and the rear leg tube to rotate from its respective initial position about the hub towards the forward leg tube, such that the stroller is folded into a closed or folded configuration. The stroller further includes a handle that may be rotated about the hub between a first open, operable, or use configuration, a second open, operable, or use configuration, and a closed, folded, or collapsed configuration. Certain dimensions and features of the example stroller are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the stroller and between features of the stroller are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

Throughout this disclosure, various aspects are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

Figure 2:
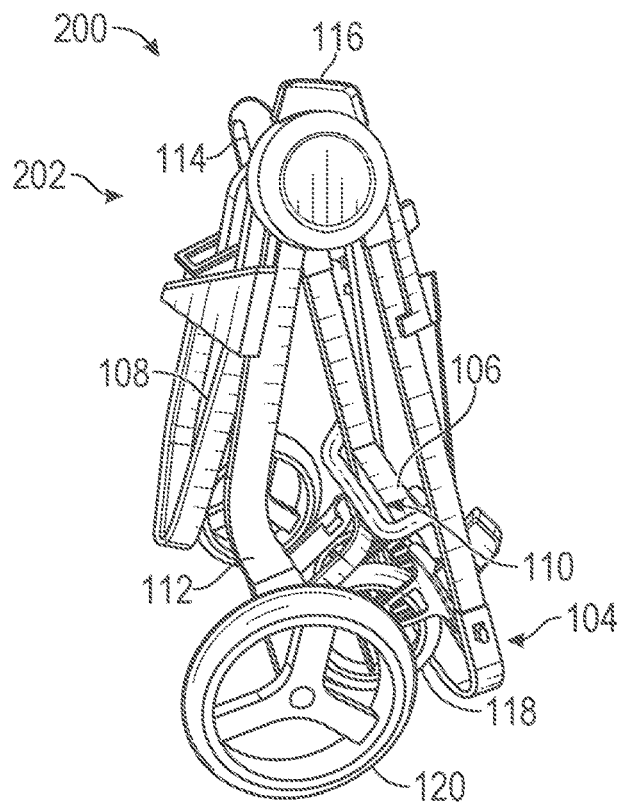
FIG. 2 illustrates a side view of an example stroller frame for a wagon-style stroller in a closed or folded configuration, according to an embodiment of the disclosure.

FIG. 1 illustrates a perspective view of an example wagon-style stroller in an open, operable, or use configuration, according to an embodiment of the disclosure. FIG. 2 illustrates a side view of an example stroller frame for a wagon-style stroller in a closed or folded configuration, according to an embodiment of the disclosure. Referring now to FIG. 1, the example stroller 100, depicted in an open, operable, or use configuration 102, can include a stroller frame capable of supporting one or more infant child seats (ICSs) and/or soft materials for providing a wagon-style compartment, as shown in FIG. 1. When in use, the stroller 100 and stroller frame 200 can be folded by a user relatively quickly, and the stroller 100 and stroller frame 200 can fold into a relatively compact closed or folded configuration. The closed or folded configuration for a stroller frame 200 is as shown in FIG. 2. When the user desires to close or fold the stroller 100 and stroller frame 200, the user can initiate the closing or folding operation by manually releasing one or more components of the stroller 100 and stroller frame 200 which cause various other components to close and fold the stroller 100 and stroller frame 200 into a relatively compact closed or folded configuration. Conversely, when the user desires to open the stroller 100 and stroller frame 200 from the closed or folded configuration, the user can initiate the opening operation by manually releasing one or more components of the stroller 100 and stroller frame 200 which cause various other components to open and unfold the stroller 100 and stroller frame 200 from the relatively compact closed or folded configuration, to the operable configuration.

In one example embodiment, the stroller 100 and stroller frame 200 can include a stroller frame having a handle 104 and a group of one or more tubes. The group of one or more tubes can include a forward upper tube 106, a rear upper tube 108, a forward leg tube 110, and a rear leg tube 112. The group of one or more tubes can be coupled to one another via at least one hub 114 having a slidable release grip 116. The stroller can include one or more forward wheels 118, and the stroller can include one or more rear wheels 120. The one or more forward wheels 118 can be coupled to the forward leg tube 110, and the one or more rear wheels 120 can be coupled to the rear leg tube 112. In one example embodiment, the stroller frame can be made of one or more pieces fixedly coupled and/or movably coupled to one another. The stroller frame can include portions that are hollow tubing and other portions that are solid core tubing and can be made from metal, plastic, composites, or other materials known in the art.

In certain embodiments, when the example stroller 100 and stroller frame 200 shown in FIGS. 1 and 2 are in the open, operable, or use configuration 102, and when slidable release grip 116 is actuated by a user, the forward upper tube 106 can rotate from its respective initial position about the hub 114 towards the forward leg tube 110, the forward leg tube 110 can rotate from its respective initial position about the hub 114 towards the rear leg tube 112, the rear upper tube 108 can rotate from its respective initial position about the hub 114 towards the rear leg tube 112, and the rear leg tube 112 can rotate from its respective initial position about the hub 114 towards the forward leg tube 110. In this way, the hub 114 can be a floating hub that is not rotatably coupled to any particular tube in the group of one or more tubes. When the group of one or more tubes are rotated about the hub 114, the stroller 100 and stroller frame 200 are in a closed or folded configuration 202, as shown in FIG. 2.

In certain embodiments, the forward upper tube 106 can be coupled to the forward leg tube 110 so that when the forward upper tube 106 is rotated about the hub 114, the forward leg tube 110 is also rotated about the hub 114. Similarly, the rear upper tube 108 can be coupled to the rear leg tube 112 so that when the rear upper tube 108 is rotated about the hub 114, the rear leg tube 112 is also rotated about the hub 114.

The handle 104 of the example stroller shown in FIG. 1 can selectively rotate about the hub 114 between a first operable or use configuration proximal to the rear upper tube 108, a second operable or use configuration proximal to the forward upper tube 106, and a folded or collapsed configuration proximal to the forward leg tube 110. The handle 104 can include one or more handle tubes disposed within one another. In one example, a first handle tube 122 can be slidably coupled within a second handle tube 124.

Figure 3A:
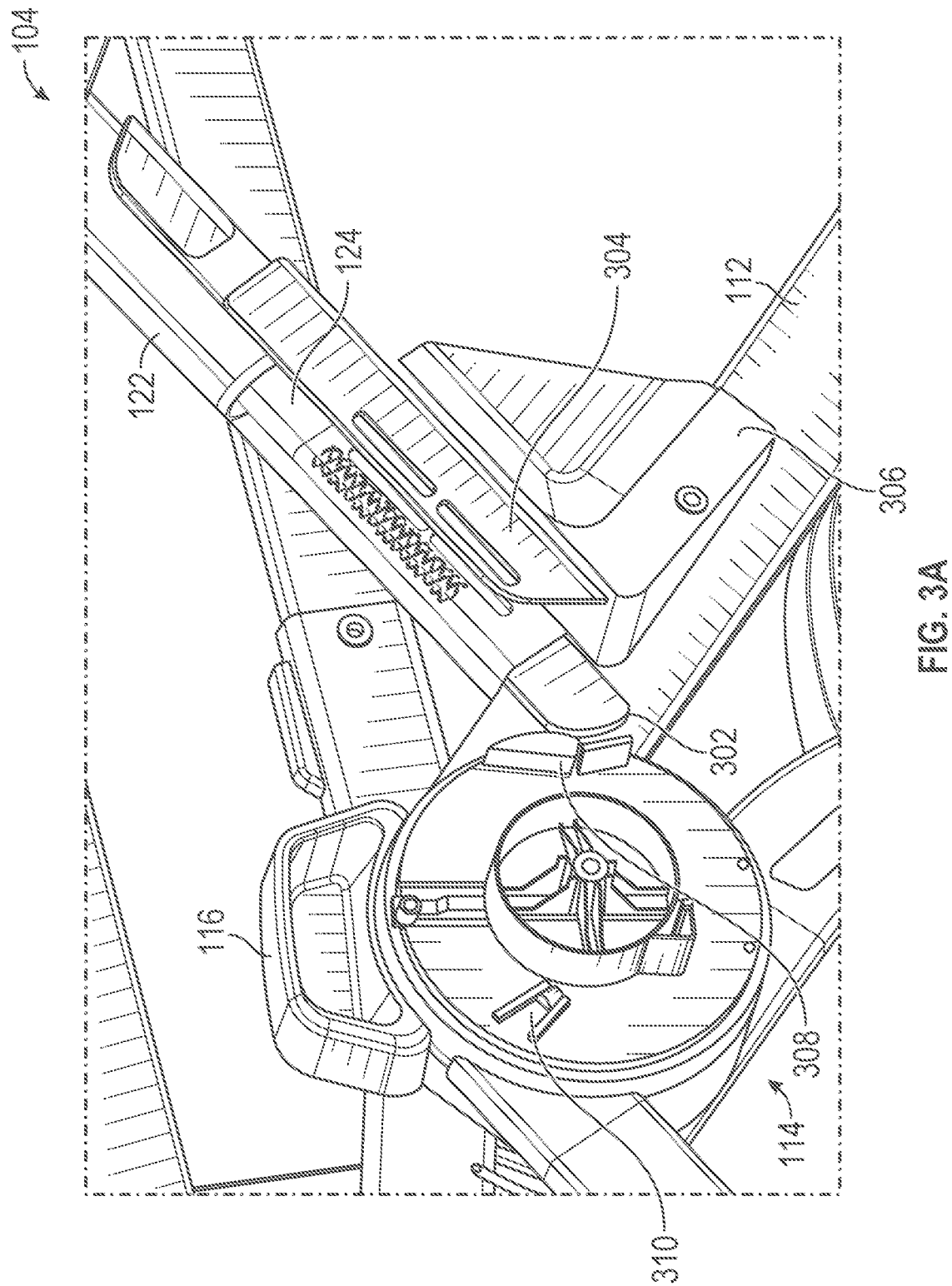
FIG. 3A illustrates a perspective view of a handle locking mechanism according to an embodiment of the disclosure.
Figure 3B:
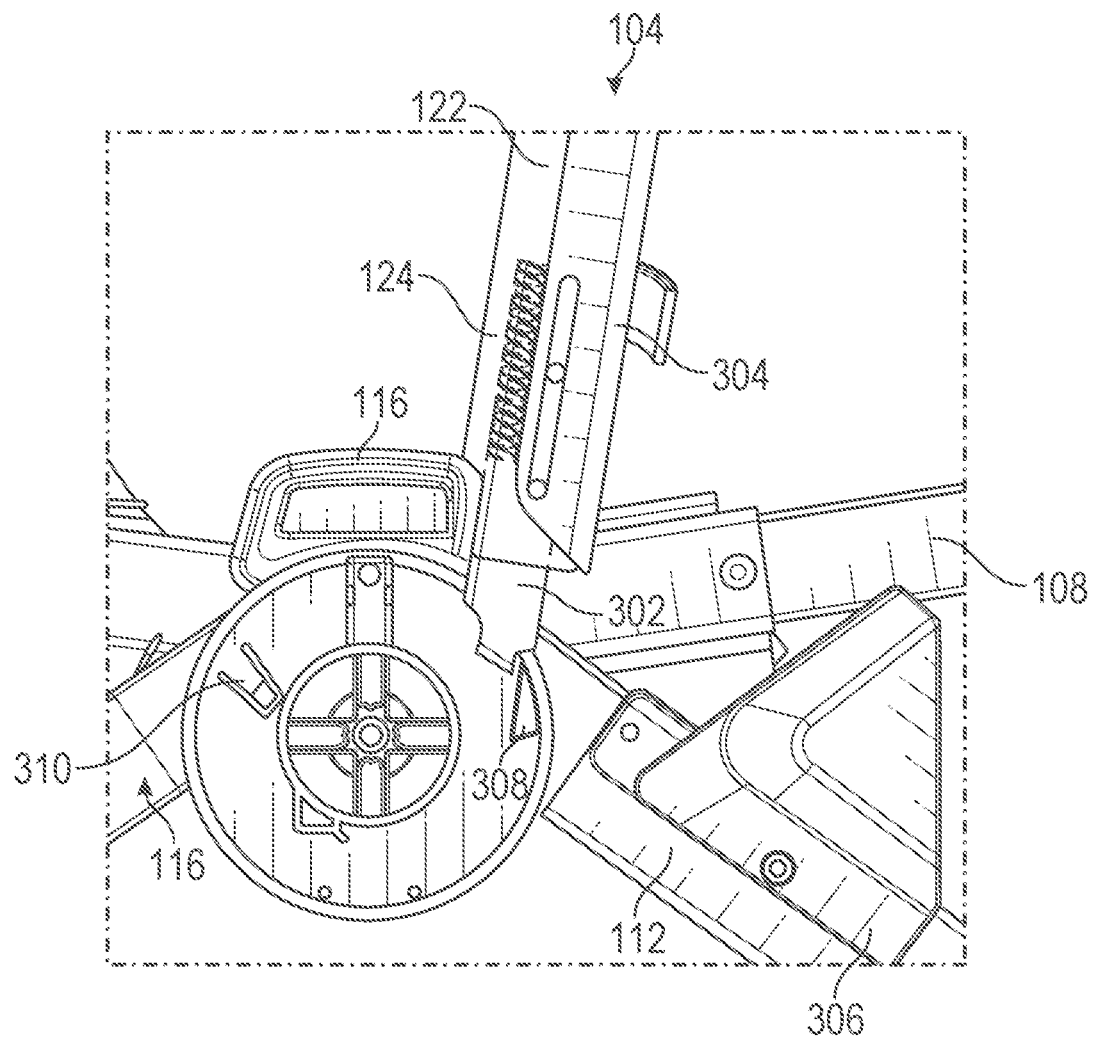
FIG. 3B illustrates a side view of the handle locking mechanism shown in FIG. 3A according to an embodiment of the disclosure.

FIG. 3A illustrates a perspective view of a handle locking mechanism for the stroller shown in FIGS. 1 and 2, according to an example embodiment of the disclosure. FIG. 3B illustrates a side view of the handle locking mechanism shown in FIG. 3A according to an example embodiment of the disclosure. The example handle locking mechanism shown in FIGS. 3A and 3B can include an inner support lock 302 disposed within the second handle tube 124, and an outer support lock 304 disposed on the outside of the second handle tube 124, wherein the inner support lock 302 and outer support lock 304 can be coupled together and can be configured to slide between a locked position, as shown in FIG. 3A, and an unlocked position, as shown in FIG. 3B. The example handle locking mechanism can include a first bottom handle support 306 coupled to the rear leg tube 112 that can be configured to secure the outer support lock 304 when the handle 104 is positioned in the first operable or use configuration and the outer support lock 304 is in the locked position. The example handle locking mechanism can include a handle safety stop 308 positioned on the hub 114 that can be configured to secure the inner support lock 302 when the handle 104 is positioned in the first operable or use configuration and the inner support lock 302 is in the locked position. The example handle locking mechanism can include a handle storage detent 310 positioned on the hub 114 that can be configured to secure the inner support lock 302 when the handle is in the second operable or use configuration and the inner support lock is in the locked position.

In some embodiments, the first handle tube 122 can be configured to slide within the second handle tube 124 to contact the inner support lock 302 and the outer support lock 304, disengaging the inner support lock 302 and the outer support lock 304 from the locked position to the unlocked position. The handle safety stop 308 can be configured to resist rotation of the handle 104 into the first operable or use configuration unless the inner support lock 302 and the outer support lock 304 are in the unlocked position, thereby preventing injuries to occupants of the stroller 100. The handle 104 can be configured to rotate between the first operable or use configuration, the second operable or use configuration, and the folded or collapsed configuration when the inner support lock 302 and the outer support lock 304 are in the unlocked position.

In some embodiments, the outer support lock 304 can be configured to slide via direct manual actuation from the locked position to the unlocked position, thereby disengaging the inner support lock 302 from the locked position to the unlocked position without actuation of the first handle tube 122. In some embodiments, the example stroller shown in FIG. 1 can be configured to include two of the handle locking mechanisms shown in FIGS. 3A and 3B. In some embodiments, when one outer support lock 304 is manually actuated from the locked position to the unlocked position, a second outer support lock on a second handle locking mechanism can be configured to be remain in the locked position unless separately manually actuated from a locked position to an unlocked position.

FIG. 4 illustrates an exploded view of an example hub 114 for a wagon-style stroller according to an embodiment of the disclosure. Hub 114 can include a central axle 402 and a first group 404 of one or more plates. The first group 404 of one or more plates can include a forward upper tube plate 406 that can be coupled to the forward upper tube 106. A first connecting pillar 408 can be coupled to the forward upper tube plate 406 and extend in a direction orthogonal to the forward upper tube plate 406.

The first group 404 of one or more plates can include a rear upper tube plate 410 that can be coupled to the rear upper tube 108. The rear upper tube plate 410 can include a first pass-through channel 412. The rear upper tube plate 410 can be positioned adjacent to the forward upper tube plate 406 such that the first connecting pillar 408 extends through the first pass-through channel 412. A second connecting pillar 414 can be coupled to the rear upper tube plate 410 and extend in a direction collinear with the first connecting pillar 408.

The first group 404 of one or more plates can include a hub spacer plate 416. The hub spacer plate 416 can include a second pass-through channel 418 and a third pass-through channel 420. The hub spacer plate 416 can be positioned adjacent to the rear upper tube plate 410 opposite the forward upper tube plate 406 such that the first connecting pillar 408 extends through the second pass-through channel 418 and the second connecting pillar 414 extends through the third pass-through channel 420.

The first group 404 of one or more plates can include a forward leg tube plate 422 that can be coupled to the forward leg tube 110. The forward leg tube plate 422 can include a first connecting channel 424 and a fourth pass-through channel 426. The forward leg tube plate 422 can be positioned adjacent to the hub spacer plate 416 opposite the rear upper tube plate 410 such that the first connecting pillar 408 extends through the first connecting channel 424 and the second connecting pillar 414 extends through the fourth pass-through channel 426. In some embodiments, the first connecting channel 424 is shorter than the fourth pass-through channel 426.

The first group 404 of one or more plates can include a rear leg tube plate 428 that can be coupled to the rear leg tube 112. The rear leg tube plate 428 can include a second connecting channel 430 and a fifth pass-through channel 432. The rear leg tube plate 428 can be positioned adjacent to the forward leg tube plate 422 opposite the hub spacer plate 416 such that the first connecting pillar 408 extends through the fifth pass-through channel 432 and the second connecting pillar 414 extends through the second connecting channel 430. In some embodiments, the second connecting channel 430 is shorter than the fifth pass-through channel 432.

The first group 404 of one or more plates can include a keep unlock plate 434. The keep unlock plate 434 can include a sixth pass-through channel 436 and a first securing channel 438. The keep unlock plate 434 can be positioned adjacent to the rear leg tube plate 428 opposite the forward leg tube plate 422 such that the first connecting pillar 408 extends through the sixth pass-through channel 436 and the second connecting pillar 414 is fixedly coupled to the first securing channel 438.

The first group 404 of one or more plates can include a locking means. The locking means can include a locking spring mechanism 440 that can be coupled to the central axle 402. The locking means can further include a locking pin shuttle 442 coupled to the slidable release grip 116.

In some embodiments, each plate in the group 404 of one or more plates can include a respective locking notch 444a-e. The locking pin shuttle 442 can be configured to lock each plate in the first group 404 of one or more plates in an open or use configuration by slidably coupling with the locking notches 444a-e. The open or use configuration can be characterized by an alignment of the locking notches 444a-e, and the open or use configuration can correspond to the open, operable, or use configuration 102 of the stroller 100 and stroller frame 200.

In some embodiments, the forward upper tube plate 406 can be configured to rotate relative to the hub spacer plate 416 in an amount defined by the length of the second pass-through channel 418 in the hub spacer plate 416. The rear upper tube plate 410 can be configured to rotate relative to the hub spacer plate 416 in an amount defined by the length of the third pass-through channel 420 in the hub spacer plate 416. The forward leg tube plate 422 can be configured to rotate relative to the forward upper tube plate 406 in an amount defined by the length of the first connecting channel 424 in the forward leg tube plate 422. The rear leg tube plate 428 can be configured to rotate relative to the rear upper tube plate 410 in an amount defined by the length of the second connecting channel 430 in the rear leg tube plate 428. The keep unlock plate 434 can be configured to be fixedly coupled to the rear upper tube plate 410 by the second connecting pillar 414.

Figure 5:
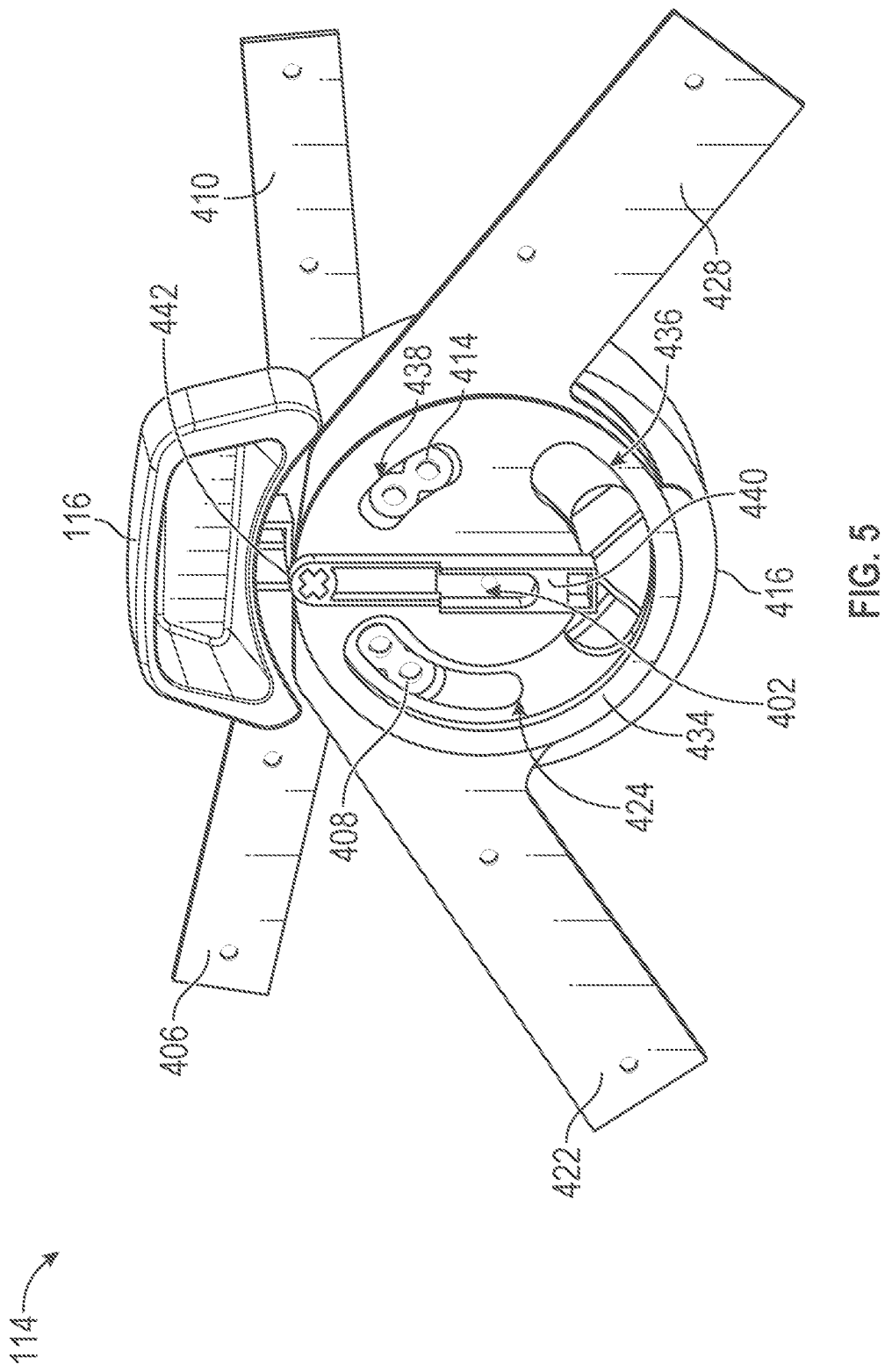
FIG. 5 illustrates a perspective view of the example hub shown in FIG. 4 in an open, operable, or use configuration according to an embodiment of the disclosure.
Figure 6B:
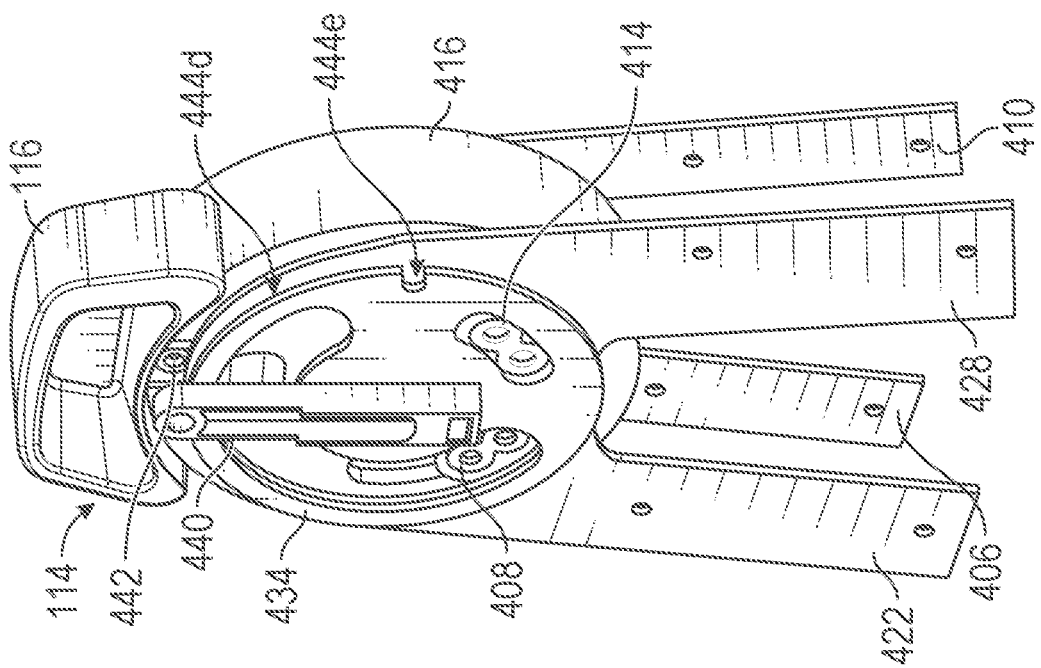
FIG. 6B illustrates a perspective view of the example hub shown in FIGS. 4, 5, and 6A in a closed or folded configuration according to an embodiment of the disclosure.

FIG. 5 illustrates a perspective view of the example hub 114 shown in FIG. 4 in an open, operable, or use position according to an embodiment of the disclosure. In this example, each of the locking notches 444a-e (not visible) are aligned and the locking pin shuttle 442 is slidably coupled with the locking notches 444a-e. As shown in FIG. 5, first connecting pillar 408 extends through first connecting channel 424. Due to the length of the first connecting channel 424, rotating the forward upper tube plate 406 towards the forward leg tube plate 422 will result in the first connecting pillar 408 sliding along first connecting channel 424 until it contacts the edge of the first connecting channel, thereby causing the forward leg tube plate 422 to rotate towards the rear leg tube plate 428, as shown in FIGS. 6A and 6B.

Figure 6A:
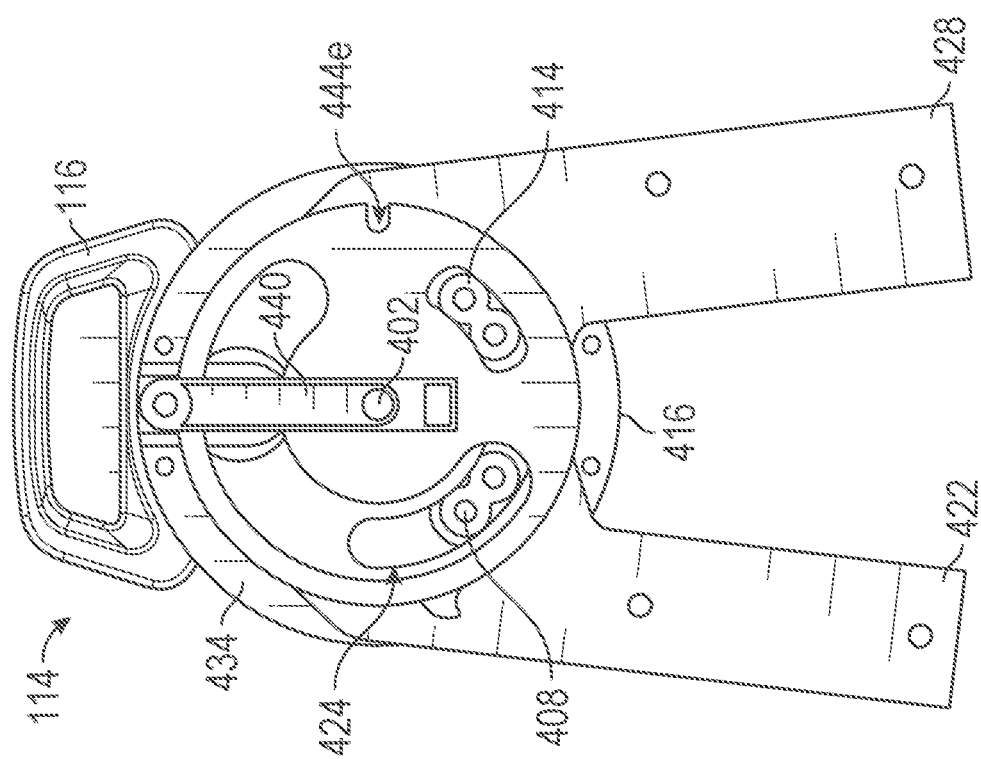
FIG. 6A illustrates a side view of the example hub shown in FIGS. 4 and 5 in a closed or folded configuration according to an embodiment of the disclosure.

FIG. 6A illustrates a side view of the example hub 114 shown in FIGS. 4 and 5 in a closed or folded configuration according to an embodiment of the disclosure. FIG. 6B illustrates a perspective view of the example hub 114 shown in FIGS. 4, 5, and 6A in a closed or folded configuration according to an embodiment of the disclosure. In some embodiments, slidable release grip 116 can be actuated to disengage the locking pin shuttle 442 from the locking notches 444a-e, thereby allowing each plate in the group 404 of one or more plates to rotate about the central axle 402 of the hub 114. As shown in FIGS. 6A and 6B, this folded or closed position is characterized by a misalignment of locking notches 444a-e, as exemplified by the relative positions of locking notches 444d and 444e in FIG. 6B.

In some embodiments, stroller 100 and stroller frame 200 can include a second hub that includes a second group of one or more plates. The second group of one or more plates can mirror the first group 404 of one or more plates in the hub 114. Each tube in the group of one or more tubes can be coupled at a first end to the first group 404 of one or more plates, and can be coupled at a second end to the second group of one or more plates. In this way, both the slidable release grip 116 on hub 114 and a second slidable release grip on the second hub can be actuated to release the group of one or more tubes so that they rotate about the hubs.

Figure 7A:
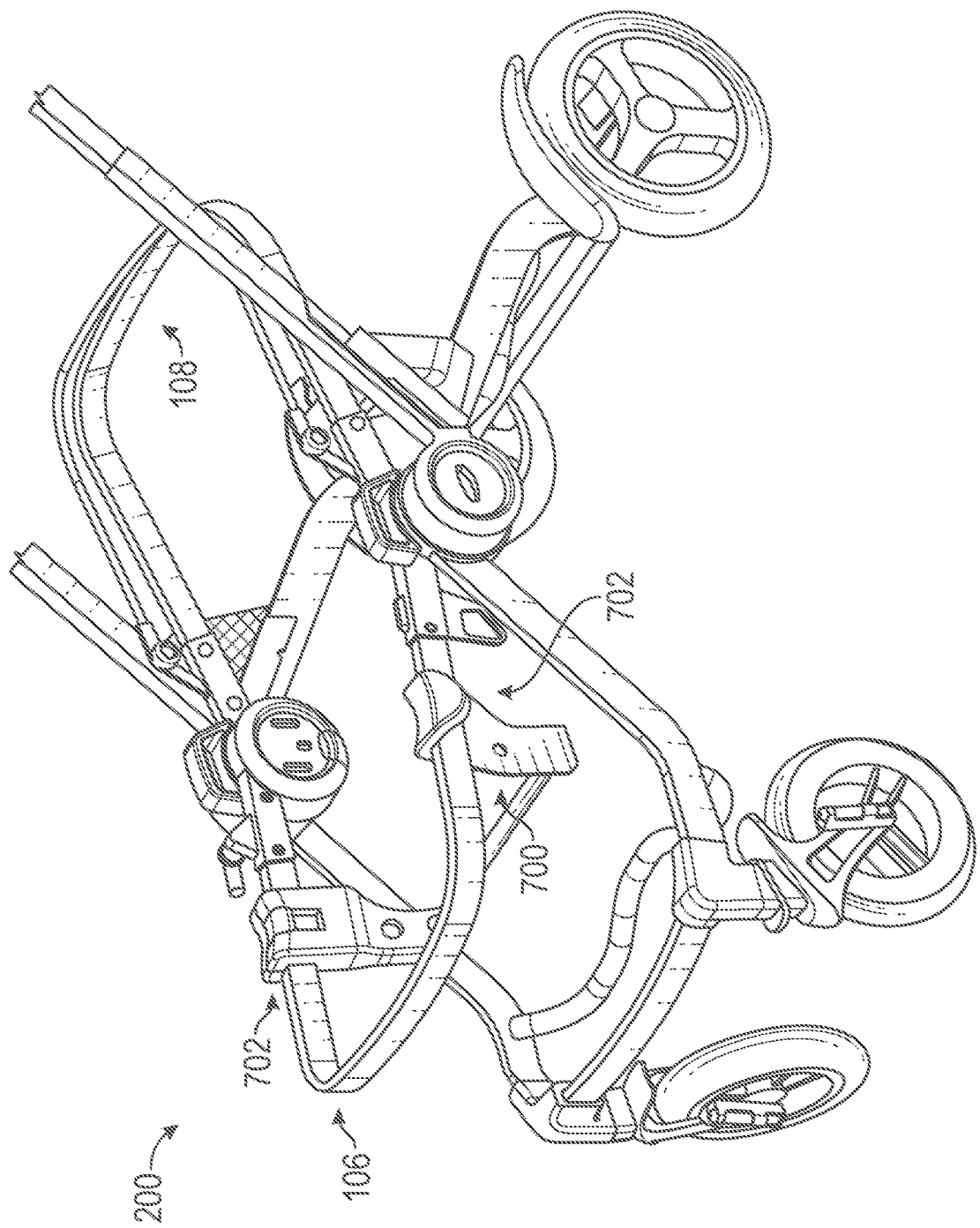
FIG. 7A illustrates a perspective view of an example stroller frame for a wagon-style stroller having an attached accessory according to an embodiment of the disclosure.
Figure 7B:
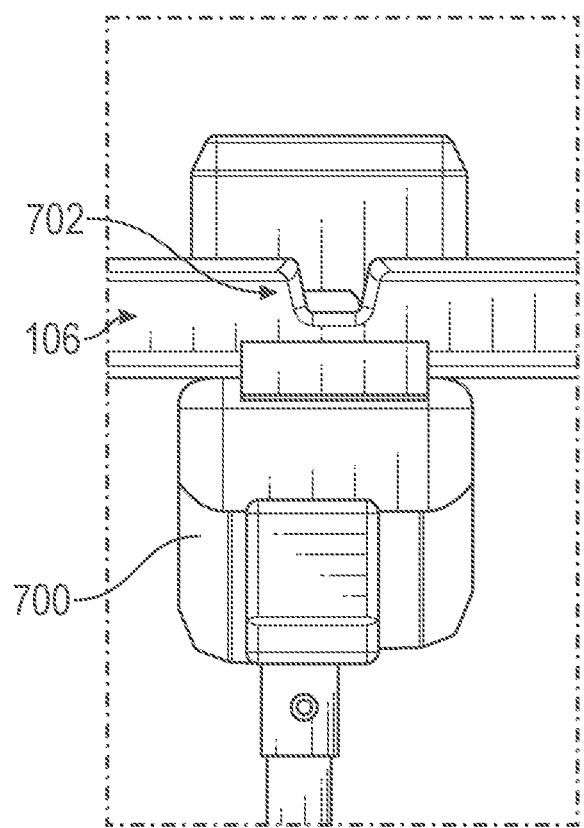
FIG. 7B illustrates a lower view of an example stroller frame for a wagon-style stroller having an attached accessory according to an embodiment of the disclosure.

FIG. 7A illustrates a perspective view of an example stroller frame 200 for a wagon-style stroller having an attached accessory 700 according to an embodiment of the disclosure. FIG. 7B illustrates a lower view of the accessory in FIG. 7A. Accessory 700 can be an infant child seat (ICS) adapter or another accessory. At least one of the forward upper tube 106 or the rear upper tube 108 can include one or more crimped portions 702. Crimped portion 702 can be configured to accept an accessory 700.

Other accessories, configurations, and corresponding operations can be used with stroller 100 and stroller frame 200, and one skilled in the art will recognize how to implement these other accessories, configurations, and corresponding operations with various embodiments according to the disclosure.

In some embodiments, both forward upper tube 106 and the rear upper tube 108 include a crimped portion 702 so that two accessories, such as two infant child seats, can be mounted to stroller 100 and stroller frame 200.

The above-described wagon-style stroller 100 and embodiments shown in the Figures can provide an easy method for folding the stroller 100 into a compact and easily transported closed or folded configuration. During the process of folding stroller 100 from the operable configuration to the closed or folded configuration, any accessory mounted on the stroller 100 may not need to be removed prior to folding.

While the example embodiments discussed above present a particular wagon-style stroller frame and associated layout or configuration for the stroller 100, these are for example purposes only as the stroller can have any other type of frame layout or configuration known to those or ordinary skill in the art. Further, while the example embodiments above show a particular type of hub 114 and an example way for various components of the stroller frame to operably connect to the hub 114, this is also only for example, as strollers can have many forms of hubs and its coordination of the folding movements of various components of the stroller frame can be adjusted as needed to accommodate fewer or greater numbers of components of other stroller frames.

While the above description contains many specifics, these specifics should not be construed as limitations on the scope of the disclosure, but merely as exemplifications of the disclosed embodiments. Those skilled in the art will envision many other possible variations that are within the scope of the disclosure.

Additionally, although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. Conditional language, such as, among others, "can," "could," "might," or "may," unless specifically stated otherwise, or otherwise understood within the context as used, is generally intended to convey that certain example embodiments could include, while other example embodiments do not include, certain features, elements, operations, and/or steps. Thus, such conditional language is not generally intended to imply that features, elements, operations, and/or steps are in any way required for one or more embodiments.

What is claimed is:

1. A collapsible wagon-style stroller comprising:
   a stroller frame comprising a handle and a group of one or more tubes, the group of one or more tubes comprising:
      a forward upper tube,
      a rear upper tube,
      a forward leg tube,
      a rear leg tube, and
      at least one hub having a slidable release grip, wherein the forward upper tube, rear upper tube, forward leg tube, and rear leg tube are coupled to one another via the hub;
   wherein when the stroller is in an operable configuration and when the slidable release grip is actuated, the forward upper tube rotates from its respective initial position about the hub towards the forward leg tube, the forward leg tube rotates from its respective initial position about the hub towards the rear leg tube, the rear upper tube rotates from its respective initial position about the hub towards the rear leg tube, and the rear leg tube rotates from its respective initial position about the hub towards the forward leg tube, and
   wherein when the forward upper tube, rear upper tube, forward leg tube, and rear leg tube have been rotated from respective initial positions to respective folded positions, the stroller is in a folded configuration, and
   wherein the handle comprises:
      a first handle tube and a second handle tube, wherein the first handle tube is slidably coupled within the second handle tube,
      an inner support lock coupled to an outer support lock and configured to slide between a locked position and an unlocked position,
      a first bottom handle support coupled to the rear leg tube and configured to secure the outer support lock when the handle is positioned in the first operable position and the outer support lock is in the locked position, a handle safety stop positioned on the hub and configured to secure the inner support lock when the handle is positioned in the first operable position and the inner support lock is in the locked position, and a handle storage detent positioned on the hub and configured to secure the inner support lock when the handle is in the second operable position and the inner support lock is in the locked position, wherein the first handle tube is configured to slide within the second handle tube to contact the inner support lock and the outer support lock, disengaging the inner support lock and the outer support lock from the locked position to the unlocked position, wherein the handle safety stop is configured to resist rotation of the handle into the first operable position unless the inner support lock and the outer support lock are in the unlocked position, thereby preventing injuries to occupants of the stroller, and wherein the handle is configured to rotate between the first operable position, the second operable position, and the collapsed position when the inner support lock and the outer support lock are in the unlocked position.

2. The stroller of claim 1, wherein:
the forward upper tube is coupled to the forward leg tube and the rear upper tube is coupled to the rear leg tube, and wherein when the stroller is opened from the folded configuration, the forward upper tube is configured to rotate about the hub and cause the forward leg tube to rotate about the hub, and the rear upper tube is configured to rotate about the hub and cause the rear leg tube to rotate about the hub.

3. The stroller of claim 1, wherein the handle is configured to selectively rotate about the hub between a first operable position proximal to the rear upper tube, a second operable position proximal to the forward upper tube, and a collapsed position proximal to the forward leg tube.

4. The stroller of claim 3, wherein the handle comprises:
an inner support lock coupled to an outer support lock and configured to slide between a locked position and an unlocked position, a first bottom handle support coupled to the rear leg tube and configured to secure the outer support lock when the handle is positioned in the first operable position and the outer support lock is in the locked position, a handle safety stop positioned on the hub and configured to secure the inner support lock when the handle is positioned in the first operable position and the inner support lock is in the locked position, and a handle storage detent positioned on the hub and configured to secure the inner support lock when the handle is in the second operable position and the inner support lock is in the locked position, wherein the outer support lock is configured to slide via manual actuation by a user, disengaging from the locked position to the unlocked position and disengaging the inner support lock from the locked position to the unlocked position, wherein the handle safety stop is configured to resist rotation of the handle into the first operable position unless the inner support lock and the outer support lock are in the unlocked position, thereby preventing injuries to occupants of the stroller, and wherein the handle is configured to rotate between the first operable position, the second operable position, and the collapsed position when the inner support lock and the outer support lock are in the unlocked position.

5. The stroller of claim 1, wherein the hub comprises a central axle and a first group of one or more plates, the first group of one or more plates comprising:
a forward upper tube plate coupled to the forward upper tube, a first connecting pillar coupled to the forward upper tube plate and extending in a direction orthogonal to the forward upper tube plate, a rear upper tube plate coupled to the rear upper tube, the rear upper tube plate comprising a first pass-through channel, wherein the rear upper tube plate is positioned adjacent to the forward upper tube plate and the first connecting pillar extends through the first pass-through channel, a second connecting pillar coupled to the rear upper tube plate and extending in a direction orthogonal to the rear upper tube plate and collinear with the first connecting pillar, a hub spacer plate comprising a second pass-through channel and a third pass-through channel, wherein the hub spacer plate is positioned adjacent to the rear upper tube plate opposite the forward upper tube plate, the first connecting pillar extends through the second pass-through channel, and the second connecting pillar extends through the third pass-through channel, a forward leg tube plate coupled to the forward leg tube, the forward leg tube plate comprising a first connecting channel and a fourth pass-through channel, wherein the forward leg tube plate is positioned adjacent to the hub spacer plate opposite the rear upper tube plate, the first connecting pillar extends through the first connecting channel, the second connecting pillar extends through the fourth pass-through channel, and the first connecting channel is shorter than the fourth pass-through channel, a rear leg tube plate coupled to the rear leg tube, the rear leg tube plate comprising a second connecting channel and a fifth pass-through channel, wherein the rear leg tube plate is positioned adjacent to the forward leg tube plate opposite the hub spacer plate, the first connecting pillar extends through the fifth pass-through channel, the second connecting pillar extends through the second connecting channel, and the second connecting channel is shorter than the fifth pass-through channel, a keep unlock plate positioned adjacent to the rear leg tube plate opposite the forward leg tube plate, the keep unlock plate comprising a sixth pass-through channel and a first securing channel, wherein the first connecting pillar extends through the sixth pass-through channel and the second connecting pillar is fixedly coupled to the first securing channel, and a locking means comprising a locking spring mechanism coupled to the central axle and a locking pin shuttle coupled to the slidable release grip.

6. The stroller of claim 5, wherein:
each plate in the first group of one or more plates comprises a respective locking notch, and the locking pin shuttle is configured to lock each plate in the first group of one or more plates in an open position characterized by an alignment of the locking notches by slidably coupling with the locking notches, the open position corresponding to the open configuration of the stroller, the forward upper tube plate is configured to rotate relative to the hub spacer plate in an amount defined by the length of the second pass-through channel in the hub spacer plate, the rear upper tube plate is configured to rotate relative to the hub spacer plate in an amount defined by the length of the third pass-through channel in the hub spacer plate, the forward leg tube plate is configured to rotate relative to the forward upper tube plate in an amount defined by the length of the first connecting channel in the forward leg tube plate, the rear leg tube plate is configured to rotate relative to the rear upper tube plate in an amount defined by the length of the second connecting channel in the rear leg tube plate, and the keep unlock plate is configured to be fixedly coupled to the rear upper tube plate by the second connecting pillar.

7. The stroller of claim 5, further comprising a second hub, the second hub comprising a second group of one or more plates, wherein:

the second group of one or more plates mirrors the first group of one or more plates, and each tube in the group of one or more tubes is coupled at a first end to the first group of one or more plates, and is coupled at a second end to the second group of one or more plates.

8. The stroller of claim 1, wherein at least one of the forward upper tube or the rear upper tube further comprises:

a crimped portion configured to accept an accessory; and a crimped locating feature configured to align the accessory.

9. The stroller of claim 8, wherein the accessory is an infant child seat (ICS) adapter for mounting an ICS to the stroller.

10. A method of folding a wagon-style stroller from an operable configuration to a folded configuration, the method comprising:

providing a stroller configured to be adjusted from the operable configuration to the folded configuration, the stroller comprising:
  a forward upper tube;
  a rear upper tube;
  a forward leg tube;
  a rear leg tube; and
  at least one hub having a slidable release grip, wherein the forward upper tube, rear upper tube, forward leg tube, and rear leg tube are coupled to one another via the hub;
wherein when the stroller is in the operable configuration and when the slidable release grip is actuated, the forward upper tube is configured to rotate about the hub towards the forward leg tube, the forward leg tube is configured to rotate about the hub towards the rear leg tube, the rear upper tube is configured to rotate about the hub towards the rear leg tube, and the rear leg tube is configured to rotate about the hub towards the forward leg tube;
wherein the hub comprises:
  a first group of one or more plates comprising:
    a forward upper tube plate coupled to the forward upper tube;
    a rear upper tube plate coupled to the rear upper tube;
    a hub spacer plate coupled to the slidable release grip;
    a forward leg tube plate coupled to the forward leg tube;
    a rear leg tube plate coupled to the rear leg tube; and
    a keep unlock plate, wherein each plate in the group of one or more plates comprises a locking notch, wherein the slidable release grip comprises a locking pin shuttle configured slidably couple with each locking notch to lock each plate in the group of one or more plates in the operable configuration characterized by an alignment of the locking notches, disengaging the locking pin shuttle from the locking notches, thereby permitting the forward upper tube, rear upper tube, forward leg tube, and rear leg tube to rotate about the hub; and folding the forward upper tube, rear upper tube, forward leg tube, and rear leg tube, wherein the stroller is in the folded configuration.

11. The method of claim 10, wherein folding the forward upper tube, rear upper tube, forward leg tube, and rear leg tube into the folded configuration, further comprises:

rotating the forward upper tube about the hub towards the forward leg tube, rotating the rear upper tube about the hub towards the rear leg tube, rotating the forward leg tube about the hub towards the rear leg tube, and rotating the rear leg tube about the hub towards the forward leg tube.

12. The method of claim 10, wherein the stroller further comprises a handle configured to selectively rotate about the hub between a first operable position proximate to the rear upper tube, a second operable position proximal to the forward upper tube, and a collapsed position proximal to the forward leg tube, and wherein the method further comprises:

rotating the handle into the collapsed position.

13. The method of claim 12, wherein:

the handle comprises:
  a first handle tube and a second handle tube, wherein the first handle tube is slidably coupled within the second handle tube,
  an inner support lock coupled to an outer support lock and configured to slide between a locked position and an unlocked position,
  a first bottom handle support coupled to the rear leg tube and configured to secure the outer support lock when the handle is positioned in the first operable position and the outer support lock is in the locked position,
  a handle safety stop positioned on the hub and configured to secure the inner support lock when the handle is positioned in the first operable position and the inner support lock is in the locked position, and
  a handle storage detent positioned on the hub and configured to secure the inner support lock when the handle is in the second operable position and the inner support lock is in the locked position, and rotating the handle comprises:
  sliding the first handle tube within the second handle tube to contact the inner support lock and the outer support lock, thereby disengaging the inner support lock and the outer support lock from the locked position to the unlocked position, and
  rotating the handle past the handle safety stop to reach the collapsed position.

14. The method of claim 12, wherein:

the handle comprises:
  an inner support lock coupled to an outer support lock and configured to slide between a locked position and an unlocked position, a first bottom handle support coupled to the rear leg tube and configured to secure the outer support lock when the handle is positioned in the first operable position and the outer support lock is in the locked position, a handle safety stop positioned on the hub and configured to secure the inner support lock when the handle is positioned in the first operable position and the inner support lock is in the locked position, and a handle storage detent positioned on the hub and configured to secure the inner support lock when the handle is in the second operable position and the inner support lock is in the locked position, and rotating the handle comprises:

sliding the outer support lock via manual actuation, thereby disengaging the inner support lock and the outer support lock from the locked position to the unlocked position, and rotating the handle past the handle safety stop to reach the collapsed position.

15. The method of claim 10, wherein the stroller further comprises an accessory coupled to at least one of the forward upper tube or the rear upper tube, and wherein folding the stroller does not require removal of the accessory.

16. A method of folding a wagon-style stroller from an operable configuration to a folded configuration, the method comprising:

providing a stroller configured to be adjusted from the operable configuration to the folded configuration, the stroller comprising a handle and a group of one or more tubes, the group of one or more tubes comprising:

a forward upper tube, a rear upper tube, a forward leg tube, a rear leg tube, and at least one hub having a slidable release grip, wherein the hub comprises a central axle and a first group of one or more plates, the first group of one or more plates comprising:

a forward upper tube plate coupled to the forward upper tube, a first connecting pillar coupled to the forward upper tube plate and extending in a direction orthogonal to the forward upper tube plate, a rear upper tube plate coupled to the rear upper tube, the rear upper tube plate comprising a first pass-through channel, wherein the rear upper tube plate is positioned adjacent to the forward upper tube plate and the first connecting pillar extends through the first pass-through channel, a second connecting pillar coupled to the rear upper tube plate and extending in a direction orthogonal to the rear upper tube plate and parallel to the first connecting pillar, a hub spacer plate comprising a second pass-through channel and a third pass-through channel, wherein the hub spacer plate is positioned adjacent to the rear upper tube plate opposite the forward upper tube plate, the first connecting pillar extends through the second pass-through channel, and the second connecting pillar extends through the third pass-through channel, a forward leg tube plate coupled to the forward leg tube, the forward leg tube plate comprising a first connecting channel and a fourth pass-through channel, wherein the forward leg tube plate is positioned adjacent to the hub spacer plate opposite the rear upper tube plate, the first connecting pillar extends through the first connecting channel, the second connecting pillar extends through the fourth pass-through channel, and the first connecting channel is shorter than the fourth pass-through channel, a rear leg tube plate coupled to the rear leg tube, the rear leg tube plate comprising a second connecting channel and a fifth pass-through channel, wherein the rear leg tube plate is positioned adjacent to the forward leg tube plate opposite the hub spacer plate, the first connecting pillar extends through the fifth pass-through channel, the second connecting pillar extends through the second connecting channel, and the second connecting channel is shorter than the fifth pass-through channel, a keep unlock plate positioned adjacent to the rear leg tube plate opposite the forward leg tube plate, the keep unlock plate comprising a sixth pass-through channel and a first securing channel, wherein the first connecting pillar extends through the sixth pass-through channel and the second connecting pillar is fixedly coupled to the first securing channel, and a locking means comprising a locking spring mechanism coupled to the central axle and a locking pin shuttle coupled to the slidable release grip;

wherein when the stroller is in the operable configuration and when the slidable release grip is actuated, the forward upper tube rotates from its respective initial position about the hub towards the forward leg tube, the forward leg tube rotates from its respective initial position about the hub towards the rear leg tube, the rear upper tube rotates from its respective initial position about the hub towards the rear leg tube, and the rear leg tube rotates from its respective initial position about the hub towards the forward leg tube, manually actuating, by a first hand of a user, the slidable release grip to release the forward upper tube, rear upper tube, forward leg tube, and rear leg tube from the operable configuration; and folding the forward upper tube, rear upper tube, forward leg tube, and rear leg tube, wherein the stroller is in a folded configuration.

17. The method of claim 16, wherein:

each plate in the group of one or more plates comprises a locking notch, and the locking pin shuttle is configured to lock each plate in the group of one or more plates in the operable position characterized by an alignment of the locking notches, the operable position corresponding to the operable configuration of the stroller, the forward upper tube is configured to rotate relative to the hub in an amount defined by the length of the second pass-through channel in the hub spacer plate, the rear upper tube plate is configured to rotate relative to the hub spacer plate in an amount defined by the length of the third pass-through channel in the hub spacer plate, the forward leg tube plate is configured to rotate relative to the forward upper tube plate in an amount defined by the length of the first connecting channel in the forward leg tube plate, the rear leg tube plate is configured to rotate relative to the rear upper tube plate in an amount defined by the length of the second connecting channel in the rear leg tube plate, the keep unlock plate is configured to be fixedly coupled to the rear upper tube plate by the second connecting pillar, and manually actuating, by a hand of a first user, the slidable release grip comprises actuating the locking pin shuttle to unlock each plate in the group of one or more plates.

18. The method of claim 16, further comprising rotating the handle into a collapsed position, wherein the handle comprises:

a first handle tube and a second handle tube, wherein the first handle tube is slidably coupled within the second handle tube, an inner support lock coupled to an outer support lock and configured to slide between a locked position and an unlocked position, a first bottom handle support coupled to the rear leg tube and configured to secure the outer support lock when the handle is positioned in the first operable position and the outer support lock is in the locked position, a handle safety stop positioned on the hub and configured to secure the inner support lock when the handle is positioned in the first operable position and the inner support lock is in the locked position, and a handle storage detent positioned on the hub and configured to secure the inner support lock when the handle is in the second operable position and the inner support lock is in the locked position, wherein the first handle tube is configured to slide within the second handle tube to contact the inner support lock and the outer support lock, disengaging the inner support lock and the outer support lock from the locked position to the unlocked position, wherein the handle safety stop is configured to resist rotation of the handle into the first operable position unless the handle is in the unlocked position, thereby preventing injuries to occupants of the stroller, wherein the handle is configured to rotate between the first operable position and the second operable position when in the unlocked position, and wherein rotating the handle into a collapsed position comprises:

sliding the first handle tube within the second handle tube to contact the inner support lock and the outer support lock, thereby disengaging the inner support lock and the outer support lock from the locked position to the unlocked position, and rotating the handle past the handle safety stop to reach the collapsed position.

* * * * *